United States Patent
Sato et al.

(10) Patent No.: US 7,128,505 B2
(45) Date of Patent: Oct. 31, 2006

(54) APPARATUS FOR PREVENTING CHIPS AND/OR CUTTING LIQUID FROM BEING SCATTERED IN MACHINE TOOL

(75) Inventors: Naoki Sato, Yamanashi (JP); Akihiko Fujimoto, Yamanashi (JP)

(73) Assignee: Fanuc Ltd., Yamanashi (JP)

( * ) Notice: Subject to any disclaimer, the term of this patent is extended or adjusted under 35 U.S.C. 154(b) by 65 days.

(21) Appl. No.: 10/462,614

(22) Filed: Jun. 17, 2003

(65) Prior Publication Data

US 2004/0031364 A1    Feb. 19, 2004

(30) Foreign Application Priority Data

Aug. 14, 2002 (JP) ............... 2002-236555

(51) Int. Cl.
*B23Q 11/00* (2006.01)

(52) U.S. Cl. ............ 409/136; 409/135; 409/219; 408/56

(58) Field of Classification Search ........... 409/136, 409/135, 137, 219; 408/56
See application file for complete search history.

(56) References Cited

U.S. PATENT DOCUMENTS

| | | | |
|---|---|---|---|
| 2,716,914 A | | 9/1955 | Pigott |
| 2,837,972 A | | 6/1958 | Knowles |
| 3,868,195 A | * | 2/1975 | Anderson et al. ........... 409/135 |
| 4,530,626 A | * | 7/1985 | Sabbioni .................... 409/135 |
| 4,585,217 A | * | 4/1986 | Erickson .................... 409/219 |
| 4,798,505 A | | 1/1989 | Ameseder |
| 5,243,745 A | * | 9/1993 | Varnau ........................ 409/219 |
| 5,245,152 A | | 9/1993 | McCall |
| 5,897,275 A | * | 4/1999 | Sella .......................... 409/219 |
| 6,196,775 B1 | * | 3/2001 | Aubin et al. ................ 409/137 |
| 6,382,887 B1 | * | 5/2002 | Nakai ......................... 409/136 |
| 6,715,971 B1 | * | 4/2004 | Curtis ........................ 409/136 |

FOREIGN PATENT DOCUMENTS

| | | |
|---|---|---|
| CN | 1216013 A | 5/1999 |
| JP | 62-74546 | 4/1987 |
| JP | 04-176537 | 6/1992 |
| JP | 05-057556 | 3/1993 |
| JP | 2592097 | 6/1993 |
| JP | 11-077475 | 3/1999 |
| JP | 2000-94261 | 4/2000 |
| JP | 2000-0924261 | 4/2000 |

OTHER PUBLICATIONS

European Search Report dated Nov. 6, 2003 for related application EP 03254996.
Notice of Grounds of Rejection for corresponding Japanese application No. 2002-235555 mailed Aug. 24, 2004.

(Continued)

*Primary Examiner*—Monica Carter
*Assistant Examiner*—Dana Ross
(74) *Attorney, Agent, or Firm*—Staas & Halsey LLP

(57) ABSTRACT

A stationary machine tool column supports a spindle head to be movable in an axial direction of the spindle. A table on which a workpiece is mounted is moved in directions orthogonal to the axial direction of the spindle. A cutting liquid feed device is fixed to the column through a support member and includes a cutting liquid nozzle and a shower nozzle. The cutting liquid nozzle is adapted to discharge cutting liquid toward a tool mounted to the spindle. The shower nozzle is adapted to discharge cutting liquid as a curtain of fluid to surround a cutting area.

15 Claims, 7 Drawing Sheets

OTHER PUBLICATIONS

First Office Action for corresponding Chinese Application 031497209 dated Dec. 12, 2004.

Partial English translation of Japanese Publication No. 05-057556, already of record.

* cited by examiner

APPARATUS FOR PREVENTING CHIPS AND/OR CUTTING LIQUID FROM BEING SCATTERED IN MACHINE TOOL

BACKGROUND OF THE INVENTION

1. Field of the Invention

This invention relates to an apparatus for preventing chips resulting from cutting a workpiece with a machine tool and/or a cutting liquid from being scattered.

2. Description of the Prior Art

A problem with a machine tool is that chips resulting from cutting a workpiece are scattered, leading to the degradation of a working environment. When the machine tool uses a cutting liquid for cutting the workpiece, the cutting liquid is also scattered. Further, the scattered cutting liquid becomes mist, leading to the pollution of a surrounding environment.

In particular, addition of various additives to the cutting liquid has been recently conducted for the purpose of providing an improved machinability, an increased cutting accuracy, an extended life of a cutting tool and so on. As a result, although the improvement on cutting conditions and the reduction in cutting time or the like are attainable, rubber and resin-made parts of the machine tool are damaged under the influence of these additives, resulting in the development of defects in some cases.

In addition, how to reduce the effect on the environment with the increasing production is generally at issue. From this point of view, a demand for preventing the chips and/or cutting liquid from being scattered is increasing particularly in the field of cutting performed with the machine tool.

FIG. 11 is a view showing a general configuration of a conventional machine tool having been realized in consideration of prevention of the chips and/or cutting liquid from being scattered. In FIG. 11, there is shown an instance of a machine tool that employs a mist collector for collecting a misty cutting liquid.

A spindle head 2 is mounted to a column 1 through a translation guide 15 in such a manner as to be movable in an axial direction of a spindle 13. A spindle unit 14 is mounted to the spindle head 2. The spindle unit 14 has the spindle 13, to which one of various tools 4 exchangeable by a tool exchanger 3 is mounted. The tool 4 mounted to the spindle 13 revolves at various revolving rates together with the spindle 13 to make a relative movement with respect to a workpiece 6 in various manners suited to cutting modes, thereby cutting the workpiece 6. The workpiece 6 is fixed in place on a table 5 supported in such a manner as to be movable in two directions (X- and Y-axis directions) orthogonal to the axial direction (Z-axis direction) of the spindle 13.

The spindle head 2 has a plurality of nozzles 22. A cutting liquid pump 20 is adapted to feed a cutting liquid from a cutting liquid tank 11 to the plurality of nozzles 22 through a cutting liquid hose 21. The cutting liquid is discharged through the nozzles 22 from the side of the spindle 13 to a plurality of predetermined positions of the tool 4. The reason why the plurality of nozzles 22 is required is that an exchange of tools involves a choice of a suitable tool among a plurality of tools, so that the cutting liquid needs to be fed to proper positions depending on the shape of the chosen tool.

When the cutting liquid hits against the revolving tool, it scatters and then becomes misty. If the revolving tool is a small-diameter tool, the cutting liquid becomes relatively less misty. However, when a large-diameter tool such as a milling cutter is used, or the cutting liquid discharged through the nozzles 22 directed to the tip end of a small-length tool hits against a large-diameter holder part of a large-length tool, it is feared that the cutting liquid yields a large quantity of mist, which is then sent to the outside of the machine tool in a scattered manner.

In this connection, in order to prevent the cutting liquid from being scattered, a cutting section of the machine tool is covered with a splash guard 23, and a mist collector is provided to collect the scattered misty cutting liquid with a duct 25. The splash guard 23 has a door 24.

The door 24 is closed while the workpiece 6 is being cut. The cutting liquid pump 20 is adapted to feed the cutting liquid from the cutting liquid tank 11 to the plurality of nozzles 22 through the cutting liquid hose 21, and the cutting liquid is discharged through the nozzles 22 toward the revolving tool 4. In this manner, the tool 4 cuts the workpiece 6.

Streams of the cutting liquid running out of a cutting area and relatively large mass droplets of the cutting liquid and/or the chips are returned into the cutting liquid tank 11 along the inside of the splash guard 23. On the other hand, the finely misty cutting liquid is exhausted through the duct 25 placed at an upper part of the machine tool, together with air being drawn into the splash guard 23 through an opening provided in a lower part of the machine tool. Although not shown, a structure is adopted, in which the misty cutting liquid having been sent to the mist collector is drained into the cutting liquid tank through a filter and/or a centrifugal separator, thereby permitting circulation of the cutting liquid.

Use of the splash guard 23 may suppress the leakage of the resultant misty cutting liquid from the machine tool to the outer circumference thereof to a large extent, while the machine tool is continuously in operation. However, it is feared that the machine tool develops defects therein in some cases under the influence of the cutting liquid and/or the chips. In such a case and/or on termination of the cutting, the door 24 needs to be opened for setup of the next cutting. It takes much time to sufficiently ventilate air in the machine tool closed up with the splash guard 23 and the door 24. For this reason, if the door is opened immediately after the termination of the cutting, the misty cutting fluid would run out of the machine tool through an opened door portion, resulting in the pollution of the outside of the machine tool with the cutting liquid and/or the chips.

Specifically, the scattered cutting liquid and/or chips exert the following influences on the machine tool and others.

Adhesion of the chips to an empty tool pot or a standby tool of the tool exchanger makes a tool exchange operation difficult, leading to the degradation of a cutting accuracy.

When the cutting liquid and/or chips are scattered on the inside of the machine tool, adhesion of the scattered cutting liquid and/or chips to a window of the splash guard makes it impossible to check to see the inner conditions of the machine tool.

Adhesion of the cutting liquid to resin- or rubber-made parts degrades (such as swelling and hardening) these parts, whose mechanical properties will be lost, leading to damages to these parts.

Adhesion of the cutting liquid to a machine tool portion coated with grease degrades or sweeps away the grease, leading to the development of defects attributable to an insufficient lubrication.

An operator who opened the door in front of the machine tool may inhale the misty cutting liquid.

When the cutting liquid is released out of the machine tool, adhesion of the released cutting liquid to a floor surface creates a dangerous slippery working environment.

In this connection, there is provided a variety of methods for preventing the chips and/or cutting liquid from being scattered, in addition to the above method that employs the splash guard and the mist collector. For instance, in Japanese Patent Application Laid-open No. 62-74546 and No. 2000-94261 and Japanese Utility Model Registration No. 2592097, a method is disclosed, in which there is provided a spindle head mounted with a cutting liquid feed device, which is adapted to discharge a cutting liquid in a circular shape, thereby allowing the cutting liquid to provide a shower curtain for preventing the cutting liquid and/or the chips from being scattered.

In the above conventional method wherein a shower is formed with cutting liquid around the tool and the spindle in order to prevent the cutting liquid and/or chips from being scattered, the cutting liquid feed device for providing the shower curtain of the cutting liquid is mounted to the spindle head. For this reason, the weight of a spindle part increases, resulting in the degradation of the acceleration/deceleration performance of the spindle part, which leads to a decreased productivity. The above method also needs to stop the feed of the cutting liquid in case of exchanging the tool. Accordingly, it is feared that the misty cutting liquid having been confined in the shower curtain might be scattered outward. It is also feared that the cutting might be started before a shower curtain is formed again subsequent to the exchange of the tool, thereby causing the misty cutting liquid to be scattered into the splash guard. If an operator starts cutting on confirming the formation of a shower curtain subsequent to the exchange of the tool in order to prevent the misty cutting liquid from being scattered, a cutting time will be prolonged, leading to the decreased productivity.

Furthermore, in the above method, the cutting liquid feed device is moved together with the spindle during the cutting operation, so that a distance between the cutting liquid feed device and the workpiece varies. Although a length of the shower curtain also varies with the movement of the cutting liquid feed device as the spindle is moved in the axial direction thereof, the volume of a space enclosed with the shower curtain tends to be kept constant. Thus, a variation in shower curtain shape occurs. As a result, the above method involves a problem in that when the spindle is moved away from the workpiece, for instance, shrinkage of the shower curtain (in other words, shrinkage of a sectional area of the shower curtain as viewed in a plane orthogonal to the tool axis in the vicinity of the workpiece) arises to such an extent that the shower curtain makes contact with a revolving part of the spindle and/or the tool, thereby causing the cutting liquid to become mist. In addition, there is a limit in the length of a shower curtain for stable formation of the shower curtain. Thus, if a tool equal to or longer than such a shower curtain is in use, a passage will be opened up through the shower curtain. It is thus feared that the chips and/or the misty cutting liquid might run out of the shower curtain through the passage thereof. Furthermore, in a horizontal-type machine tool with the spindle having an axis in parallel to a horizontal direction, there is a limit in the length of a shower curtain for stable formation of the shower curtain under the influence of gravity. Thus, all that is attained is a small-length shower curtain. Accordingly, the above method is not supposed to be suitable to the horizontal-type machine tool.

SUMMARY OF THE INVENTION

It is an object of the present invention to provide an apparatus for preventing chips and/or cutting liquid from being scattered in a machine tool, whereby the chips and/or cutting liquid may be surely prevented from being scattered.

The present invention relates to an apparatus for preventing chips and/or cutting liquid from being scattered in a machine tool that allows a spindle to move relatively to the workpiece, thereby cutting the workpiece. A support member is mounted to the machine tool in such a manner that the support member keeps a fixed relative position with respect to the workpiece constant, and also keeps a fixed relative position with respect of the spindle constant in directions orthogonal to the axial direction of the spindle. In addition, a liquid discharge means for discharging a liquid in a shape of film is mounted to the support member in such a manner that the liquid discharge means is adapted to discharge the liquid in the shape of film to the outer circumference of an area into which the spindle or the tool mounted to the spindle is advanced.

Furthermore, the liquid discharge means has an air inlet path. One opening of the air inlet path is provided on the inside of a liquid discharge opening of the liquid discharge means, while the other opening of the air inlet path is provided at a position isolated from an air current caused by the revolution of the spindle.

BRIEF DESCRIPTION OF THE DRAWINGS

The foregoing and other objects and features of the invention will become apparent from the following description of the preferred embodiments of the invention with reference to the accompanying drawings, in which.

DESCRIPTION OF EMBODIMENTS

Figure 1:
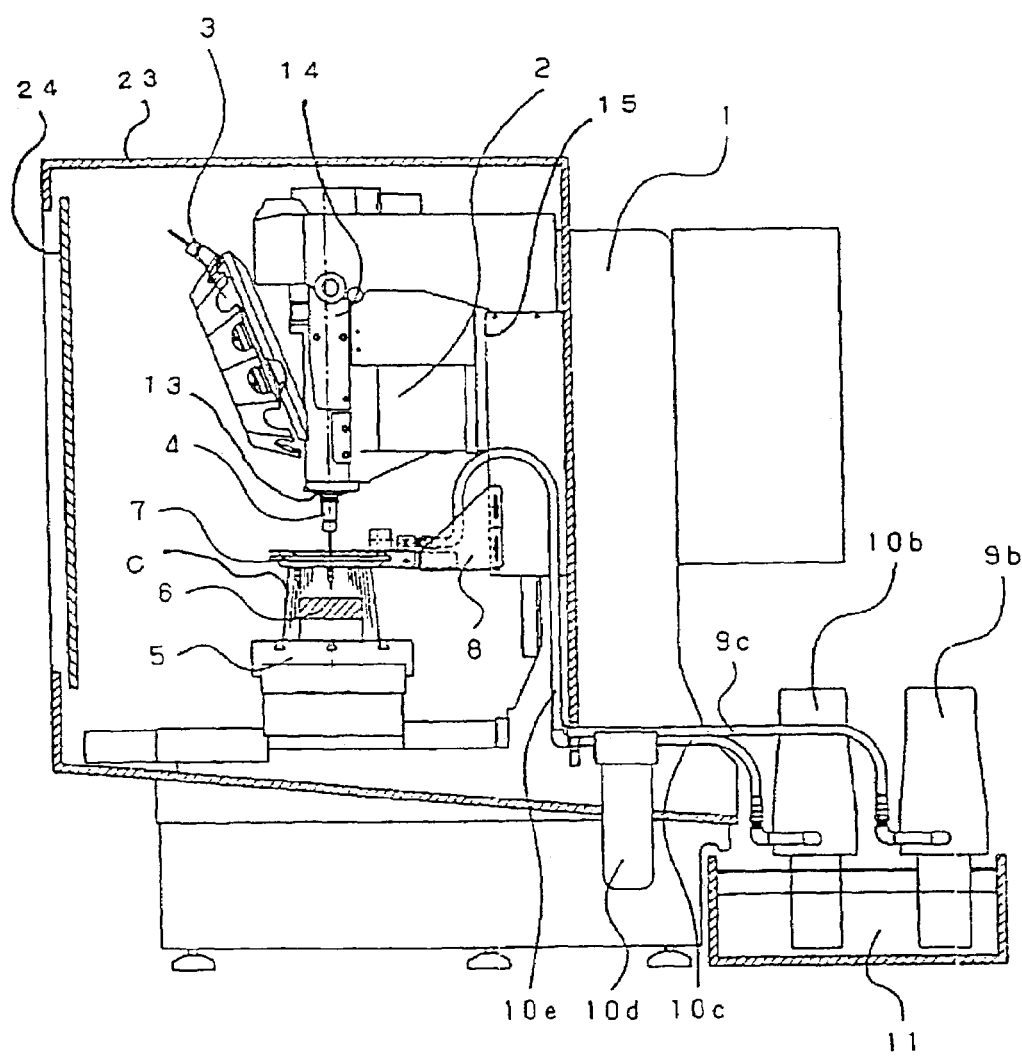
FIG. 1 is a side view showing an application of an embodiment of an apparatus for preventing chips and/or cutting liquid from being scattered according to the present invention to a longitudinal-type machine tool.

FIG. 1 is side view showing a machine tool having an embodiment of an apparatus for preventing chips and/or cutting liquid from being scattered according to the present invention.

A spindle head 2 is supported with a column 1 in such a manner as to be movable in an axial direction of a spindle 13 through a translation guide 15. A spindle unit 14 is mounted to the spindle head 2. The spindle unit 14 has the spindle 13, to which one of various tools 4 exchangeable by a tool exchanger 3 is mounted. The tool 4 mounted to the spindle 13 is adapted to revolve at various revolving rates together with the spindle 13. A workpiece 6 is fixed in place on a table 5. The table 5 is supported in such a manner as to be movable in two directions (X- and Y-axis directions) orthogonal to an axial direction (Z-axis direction) of the spindle 13. The tool 4 makes a relative movement to the workpiece 6 in various manners suited to cutting modes, thereby cutting the workpiece 6.

A space of a cutting section, which includes the tool 4 and the workpiece 6, is defined by a splash guard 23 and a door 24. In addition, the machine tool has at a lower part thereof a passage which allows a cutting liquid C having been fed to the cutting section to return to a cutting liquid tank 11.

The above configuration of the machine tool according to the present invention is the same as that of the conventional machine tool. It is to be noted that the embodiment of the machine tool according to the present invention is characterized in that a cutting liquid feed device 7 is not a device mounted to the spindle head 2 but a device mounted to the column 1.

Figure 2:
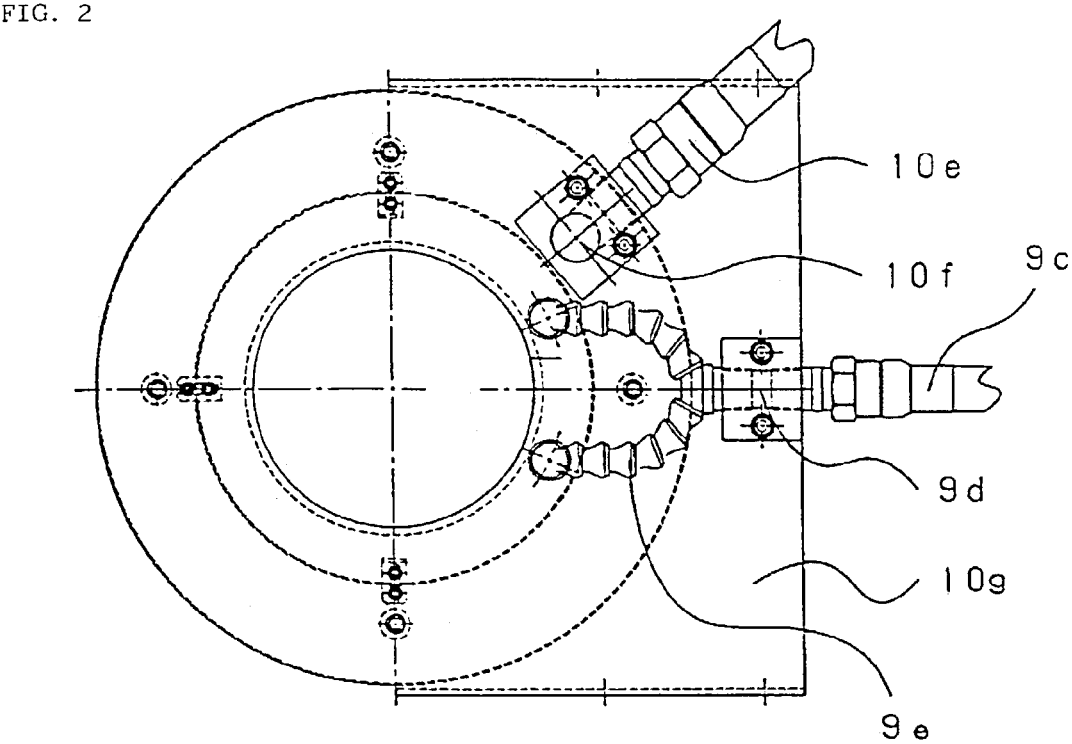
FIG. 2 is a top view showing a cutting liquid feed device of FIG. 1.
Figure 3:
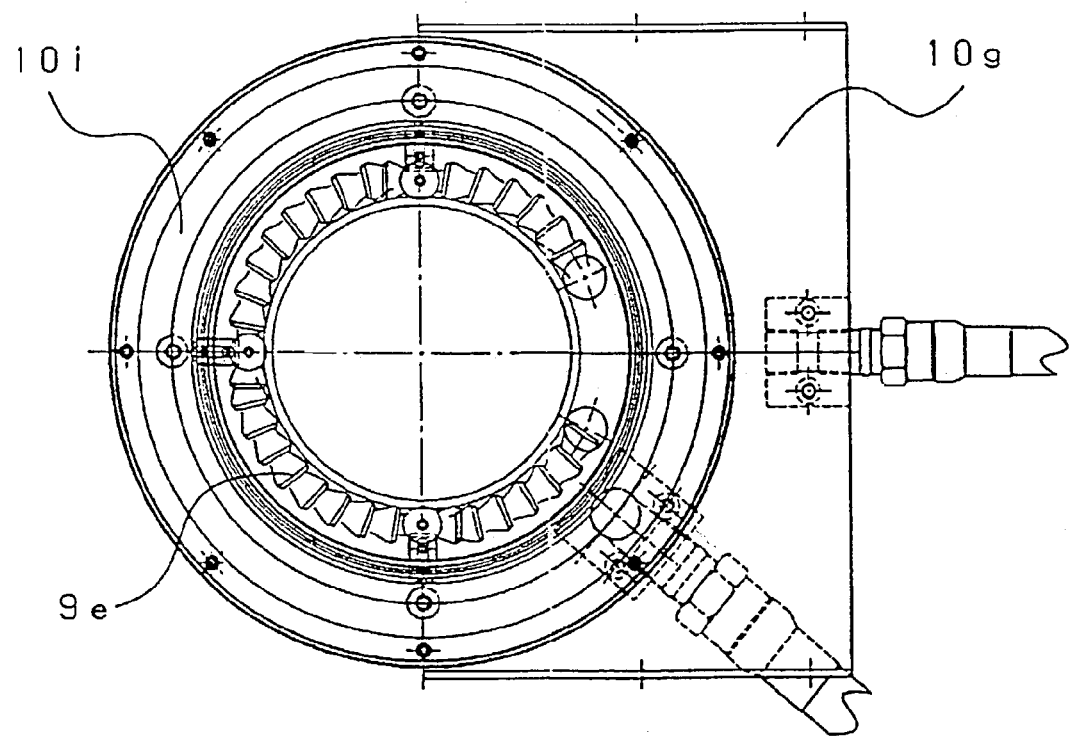
FIG. 3 is a bottom view showing the cutting liquid feed device of FIG. 2.
Figure 4:
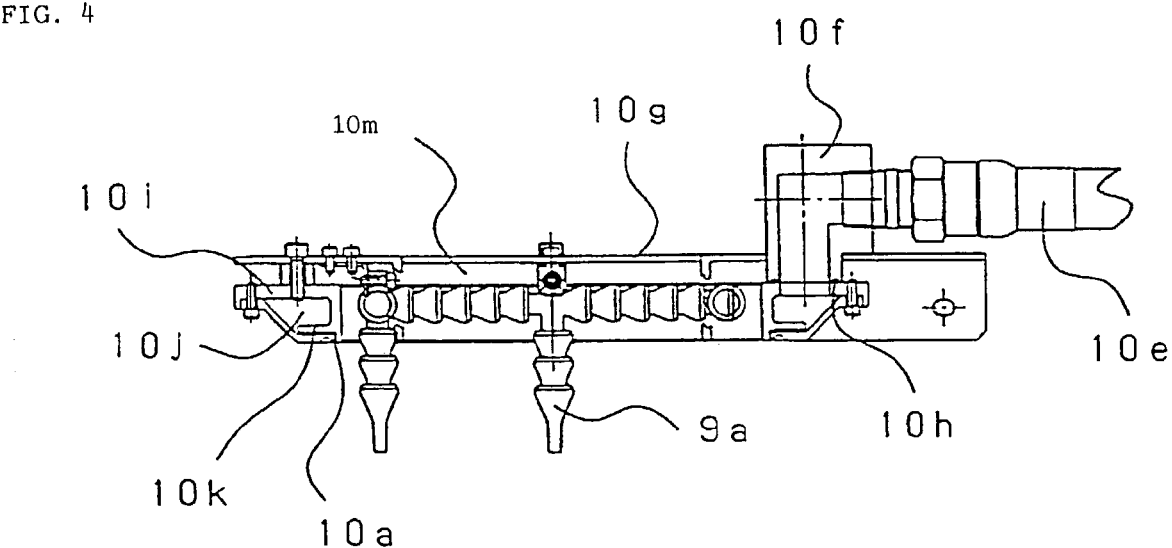
FIG. 4 is a side sectional view showing the cutting liquid feed device of FIG. 2.

The cutting liquid feed device 7 is provided at a support member 8 fixed to the column 1. FIGS. 2, 3 and 4 are a top view, a bottom view and a side sectional view of the cutting liquid feed device 7, respectively. The cutting liquid feed device 7 includes a cutting liquid nozzle 9*a*, a shower nozzle 10*a* and two piping systems for feeding the cutting liquid C to these nozzles 9*a* and 10*a*.

The cutting liquid feed device 7 has an annular shower nozzle unit 10*i*. The shower nozzle unit 10*i* is mounted to a support plate log having a circular hole in the center. The support plate 10*g* is fixed to the support member 8 (See FIG. 1). The support plate 10*g* has a shower nozzle manifold 10*f*, and the shower nozzle manifold 10*f* is connected to the shower nozzle unit 10*i* through an O-ring 10*h*.

The shower nozzle unit 10*i* has therein a cutting liquid circulation path 10*j*. The cutting liquid circulation path 10*j* has a narrow portion, which is restricted by a partition wall 10*k*, thereby providing the shower nozzle 10*a*. Then, the shower nozzle unit 10*i* and the support plate 10*g* constitute a liquid discharge means, and the shower nozzle 10*a* constitutes a liquid discharge opening of the liquid discharge means.

The partition wall 10*k*, adapted to narrow the cutting liquid circulation path 10*j* extending to the shower nozzle 10*a*, serves to decrease the flow rate of the cutting liquid C fed into the shower nozzle unit 10*i* through the shower nozzle manifold 10*f* so as to fill the cutting liquid circulation path 10*j* with the cutting liquid C, thereby forming the film-shaped cutting liquid C (shower curtain) discharged through the shower nozzle 10*a* in uniform and continuous manners. Further, there is provided an air inlet path 10*m* between the support plate 10*g* and the shower nozzle unit 10*i*.

To the shower nozzle manifold 10*f* is connected a shower nozzle hose 10*e*. The shower nozzle hose 10*e* is also connected to a shower nozzle pump 10*b* through a chip removal filter 10*d* and a hose 10*c*.

In addition, a cutting liquid manifold 9*d* is mounted to the support plate 10*g*. To the cutting liquid nozzle manifold 9*d* is connected a cutting liquid path 9*e* formed on the inside of the annular shower nozzle unit 10*i*. To the cutting liquid path 9*e* is connected a plurality of cutting liquid nozzles 9*a*. It is to be noted that the reason why the plurality of cutting liquid nozzles 9*a* is required is that the cutting liquid C needs to be fed to proper positions of each tool depending on the various kinds of tools.

A cutting liquid nozzle hose 9*c* is connected to the cutting liquid nozzle manifold 9*d* mounted to the support plate 10*g*, and a cutting liquid nozzle pump 9*b* is adapted to feed the cutting liquid C from the cutting liquid tank 11 to the plurality of cutting liquid nozzles 9*a*.

In performing the cutting, the tool 4 is mounted to the spindle 13, and the spindle head 2 is moved along the translation guide 15, thereby allowing the tool 4 to move in the axial direction (Z-axis direction) of the spindle 13. The table 5 is moved in two directions (X- and Y-axis directions) orthogonal to the axial direction of the spindle 13. In this manner, the workpiece 6 is subjected to desired cutting.

While the workpiece 6 is being cut, the cutting liquid nozzle pump 9*b* and the shower nozzle pump 10*b* are driven. The cutting liquid C pumped up by the cutting liquid nozzle pump 9*b* from the cutting liquid tank 11 is fed through the cutting liquid nozzle hose 9*c*, the cutting liquid nozzle manifold 9*d* and the cutting liquid path 9*e* to the plurality of cutting liquid nozzles 9*a*, through which the cutting liquid C is jet to the predetermined position on the predetermined tool 4.

The cutting liquid C pumped up by the shower nozzle pump 10*b* from the cutting liquid tank 11 is introduced to the shower nozzle unit 10*i* through the shower nozzle hose 10*c*, the chip removal filter 10*d*, the shower nozzle hose 10*e* and the shower nozzle manifold 10*f*.

The cutting liquid C filled in the cutting liquid circulation path 10*j* inside the shower nozzle unit 10*i* is fed through the narrow path restricted by the partition wall 10*k* to the shower nozzle 10*a*, through which the cutting liquid C is jet so as to surround the spindle 13 and the tool 4. The shower nozzle 10*a* is in the shape of an annular slit, thereby providing a substantially cylindrical shower curtain that surrounds the spindle 13 and the tool 4.

As chips or the like mixed in the cutting liquid C filled in the cutting liquid circulation path 10*j* have been already removed by means of the chip removal filter 10*d*, the narrow path restricted by the partition wall 10*k* and/or a clearance of the shower nozzle 10*a* is never clogged with the chips contained in the cutting liquid C. Accordingly, the uniform shower curtain is formed in a continuous manner, and the cutting area is surrounded with this shower curtain.

The cutting liquid C, which has been discharged through the plurality of cutting liquid nozzles 9*a*, hits against the revolving tool and/or the workpiece and is scattered, and the mist of the cutting liquid C is surrounded with the cylindrical shower curtain discharged through the shower nozzle 10*a*, and as a result, is prevented from being further scattered. Among the chips produced by cutting the workpiece 6 with the tool 4, lighter chips are caused to flow downward with the shower curtain of the cutting liquid C, while heavier chips are allowed to run out of the shower curtain of the cutting liquid C. It is to be noted that the shower curtain of the cutting liquid C dissipates the energy of the heavy chips, so that there is no possibility that the heavier chips are scattered in the distance. Among the chips produced by cutting the workpiece 6 with the tool 4, lighter chips are caused to flow downward with the shower curtain of the cutting liquid C, while heavier chips are allowed to run out of the shower curtain of the cutting liquid C. It is to be noted that the shower curtain of the cutting liquid C dissipates the energy of the heavy chips, so that there is no possibility that the heavier chips are scattered in the distance.

Thus, the chips can be prevented from being scattered upward to the tool exchanger mounted with the empty tool pot or the standby tool, with the result that adhesion of the chips to the empty tool pot or the standby tool in the tool exchanger can be eliminated, thereby removing a hindrance to be caused at the time of tool exchange and keeping a cutting accuracy high.

The apparatus for preventing the chips and/or cutting liquid from being scattered according to the above embodiment is applied to the machine tool of a type in which the tool 4 is moved in the axial direction (Z-axis direction) of the spindle 13, and the table 5 to which the workpiece 6 is fixed is moved in two directions (X- and Y-axis directions) orthogonal to the Z-axis direction. In addition, according to the apparatus of the above embodiment, the cutting liquid feed device 7 including the cutting liquid nozzle 9a and the shower nozzle 10a is fixedly mounted to the column 1 of the machine tool of the above type, thereby allowing the tool 4 and the spindle 13 to move in the axial direction of the spindle 13 through a central position of the cutting liquid feed device 7 (i.e., through a hole formed in the support plate 10g at the center thereof).

Accordingly, the relative position of the cutting liquid feed device 7 (the liquid discharge means such as the cutting liquid nozzle 9a and the shower nozzle 10a) with respect to the workpiece 6 is kept constant in the axial direction (Z-axis direction) of the spindle 13. Further, the relative position of the cutting liquid feed device 7 with respect to the spindle 13 is also kept constant in the two directions (X- and Y-axis directions) orthogonal to the axial direction of the spindle 13. In other words, the position at which the tool 4 cuts the workpiece 6 will be always surrounded with the cylindrical shower curtain. Besides, even if the spindle 13 and/or the table 5 is moved, the length of the shower curtain remains unchanged, so that the stabled cylindrical shower curtain may be maintained during the cutting operation. In other words, the present embodiment is effective in avoiding the problem of the conventional art such that instability in forming a shower curtain of film-shaped cutting liquid may arise as the length of the shower curtain is varied.

Further, the air inlet path 10m is provided between the shower nozzle unit 10i and the support plate 10g, so that the shower curtain may be prevented from being deformed, pulsated, broken and so on due to an air current caused by the revolution of the tool 4 and the spindle 13.

Figure 7:
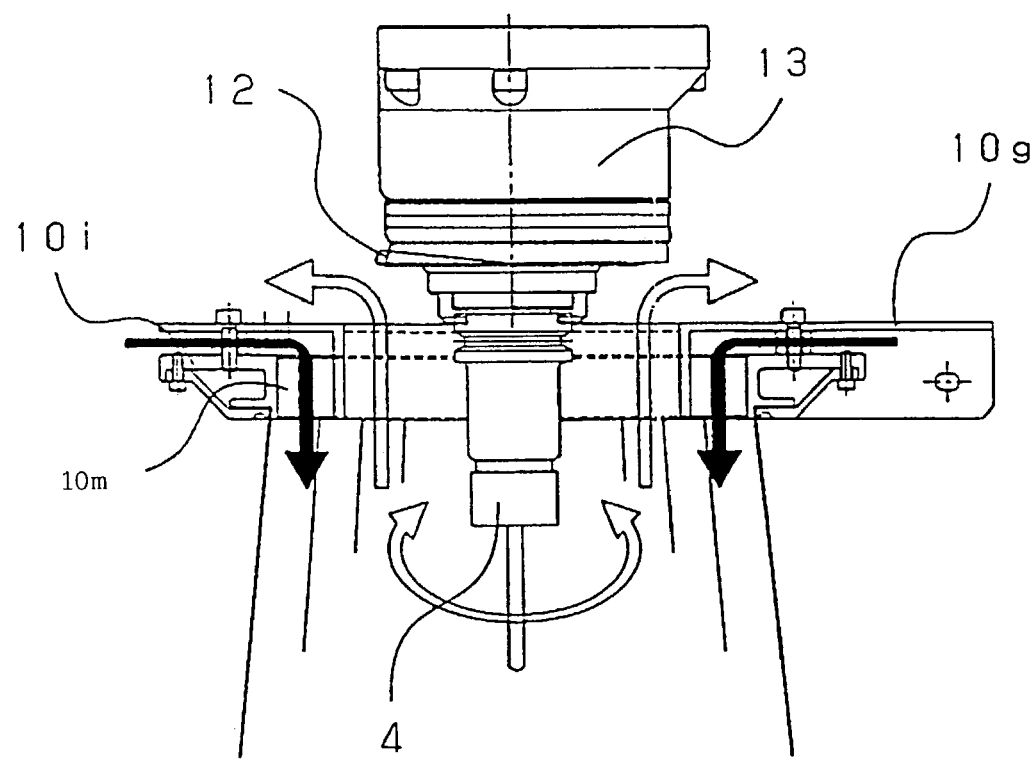
FIG. 7 illustrates how to circulate air around a tool and a spindle when the cutting liquid feed device of FIG. 1 forms a shower curtain of the cutting liquid around the tool.

FIG. 7 illustrates an air circulation caused with respect to the shower curtain with the revolutions of the tool 4 and the spindle 13.

The air inlet path 10m extends through an opening between the shower nozzle unit 10i and the support plate 10g and is open to the inside of the shower nozzle unit 10i. The air inlet path 10m is adapted to provide a communication between the inside and the outside of the shower curtain.

The spindle 13, provided with a spindle gear 12 for driving a turret, and the tool 4 act to exhaust the air out of the shower curtain with the air current caused by the revolutions of the spindle 13 and the tool 4 so as to reduce a pressure in the shower curtain, as shown in FIG. 7. On the other hand, the outside air is introduced into the shower curtain through the opening and the air inlet path 10m, isolated with the support plate 10g so that air is not affected by the air current caused by the revolution of the spindle. Thus, the reduction of pressure in the shower curtain is prevented, and as a result, the deformation, pulsation, breakage and so on of the cylindrical shower curtain discharged through the shower nozzle 10a can be prevented or lessened.

Figure 8:
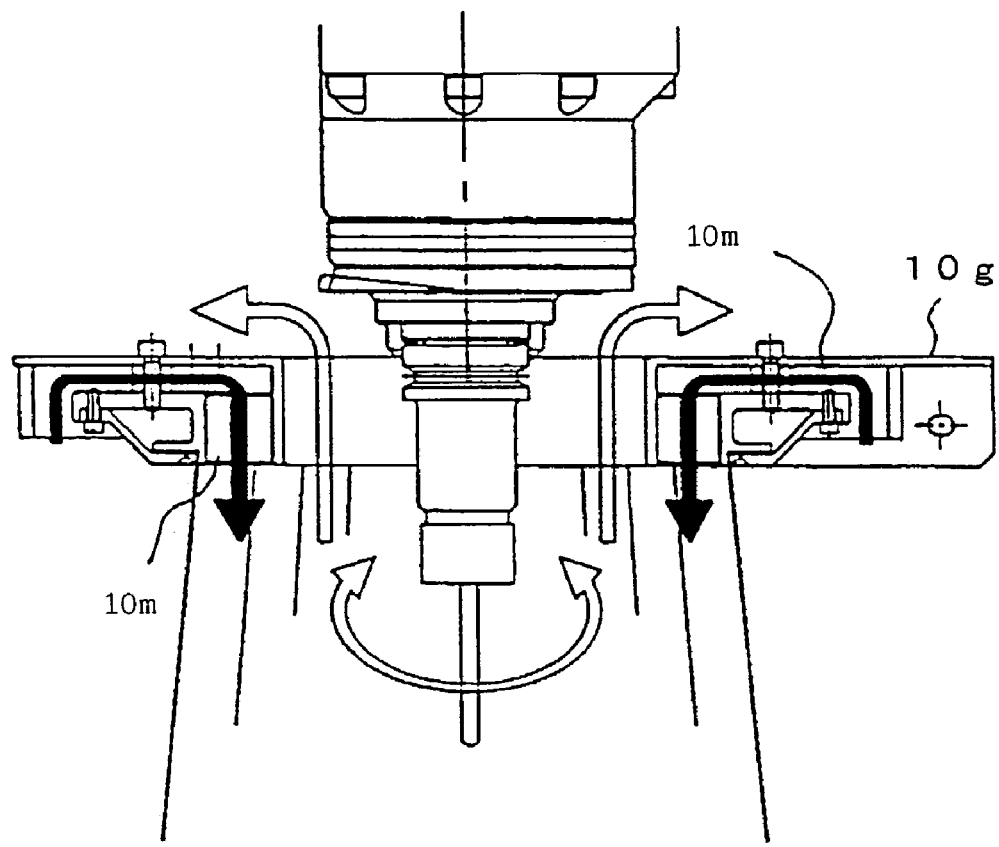
FIG. 8 illustrates how to circulate air around the tool and the spindle in a different manner from that shown in FIG. 7 when the cutting liquid feed device of FIG. 1 forms the shower curtain of the cutting liquid around the tool.

FIG. 8 shows another embodiment of an opening through which air is introduced into the shower curtain.

The embodiment shown in FIG. 8 also has the air inlet path 10m which is isolated with the support plate 10g so that air is not affected by the disturbance of air current caused by the revolutions of the spindle 13 and the tool 4.

As described above, the cutting liquid feed device 7 including the cutting liquid nozzle 9a and the shower nozzle 10a is fixed to the column 1, not to the spindle head 2 as in the case of the prior art. Thus, as the weight of the spindle part does not increase in the case of the present invention, the acceleration/deceleration performance for the movement of the spindle does not deteriorate. In the case of the conventional art, as the cutting liquid feed device is mounted to the spindle head, lifting of the spindle for the exchange of tool brings about lifting of cutting liquid feed device, so that the feed of the cutting liquid C to the cutting liquid nozzle 9a and the shower nozzle 10a has to be stopped. In the case of the present invention, on the other hand, when the spindle 13 is lifted for the exchange of tool, the cutting liquid feed device does not lift together with the spindle 13, so that the feed of the cutting liquid C to the cutting liquid nozzle 9a and the shower nozzle 10a need not be stopped, allowing the cutting liquid C to be fed without interruption. For this reason, it does not matter if the spindle is rotated and cutting is started immediately after the exchange of the tool, so that it is possible to increase the working efficiency. In addition, according to the present invention, a shower curtain can be formed continuously, so that it is possible to suppress the surrounding environment from being polluted with the mist of cutting liquid C and/or chips scattered outside the machine tool.

In the above embodiment, the cutting liquid nozzle 9a is fixed to the column 1. Alternatively, the cutting liquid nozzle 9a may be mounted to the spindle 13, as long as the discharge of the cutting liquid C into the shower curtain is attainable.

In the above embodiment, the shower nozzle 10a that forms a shower curtain of the cutting liquid C is in the shape of the annular slit. However, as the shower curtain is only needed to surround the cutting section for the workpiece 6 around the tool 4 and the spindle 13, the shape of the shower nozzle 10a that forms the shower curtain is not limited to the annular shape, and other shapes are also applicable.

FIGS. 5(a) to 5(h) illustrate other shapes of the shower nozzle that provides the shower curtain, respectively. In FIGS. 5(a) to 5(h), a slanted line part represents a portion enclosed with the shower nozzle. The spindle 13 and the tool 4 move in the direction perpendicular to the drawing sheet to enter the slanted line part. A solid line part that encloses the slanted line part represents the shape of a slit that forms the shower nozzle.

Figure 5:
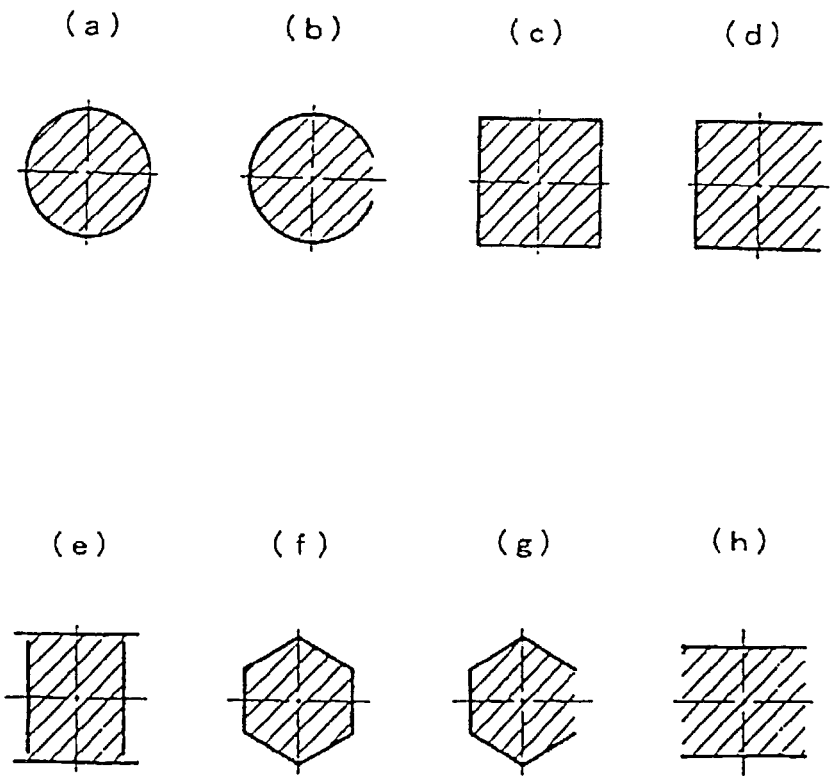
FIGS. 5(a) to 5(h) are views showing various shapes of a shower nozzle provided as one of the constituents of the cutting liquid feed device, respectively.

FIG. 5(a) shows an embodiment in which an annular shower nozzle is provided. FIG. 5(b) shows an embodiment in which a part of the annular shower nozzle is open. As shown in FIG. 5(b), it is not always necessary to form the shower nozzle in a closed shape. FIG. 5(c) shows an embodiment in which a quadrate shower nozzle is provided. FIG. 5(d) shows an embodiment in which one side of the quadrate shower nozzle is open. FIG. 5(e) shows an embodiment in which a shower nozzle composed of four linear shower nozzle elements is provided. FIG. 5(f) shows an embodiment in which a pentagonal shower nozzle is provided. FIG. 5(g) shows an embodiment in which one side of the pentagonal shower nozzle is open. FIG. 5(h) shows an embodiment in which a shower nozzle composed of two linear shower nozzle elements parallel to each other is provided.

Figure 6:
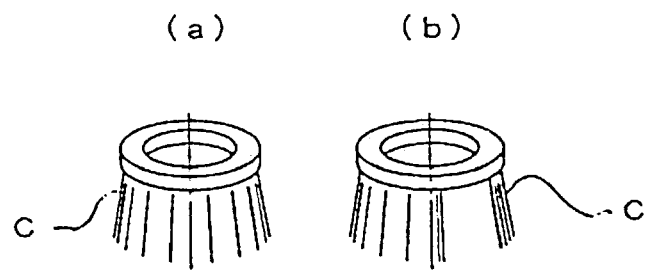
FIGS. 6(a) and 6(b) are views showing the state of shower nozzles having the shapes as shown in FIGS. 5(a) and 5(b) when a liquid is being discharged through these shower nozzles, respectively.

FIG. 6(a) shows the state of the cutting liquid C discharged through the shower nozzle of FIG. 5(a), and FIG. 6(b) shows the state of the cutting liquid C discharged through the shower nozzle of FIG. 5(b).

The apparatus for preventing the chips and/or cutting liquid from being scattered according to the above embodiment is applied to a longitudinal-type machine tool where the direction of the spindle axis is vertical. However, the apparatus for preventing the chips and/or cutting liquid from being scattered according to the present invention can also be applied to a horizontal-type machine tool where the direction of the spindle axis is horizontal, as the length of the shower curtain is fixed and not changed.

Figure 9:
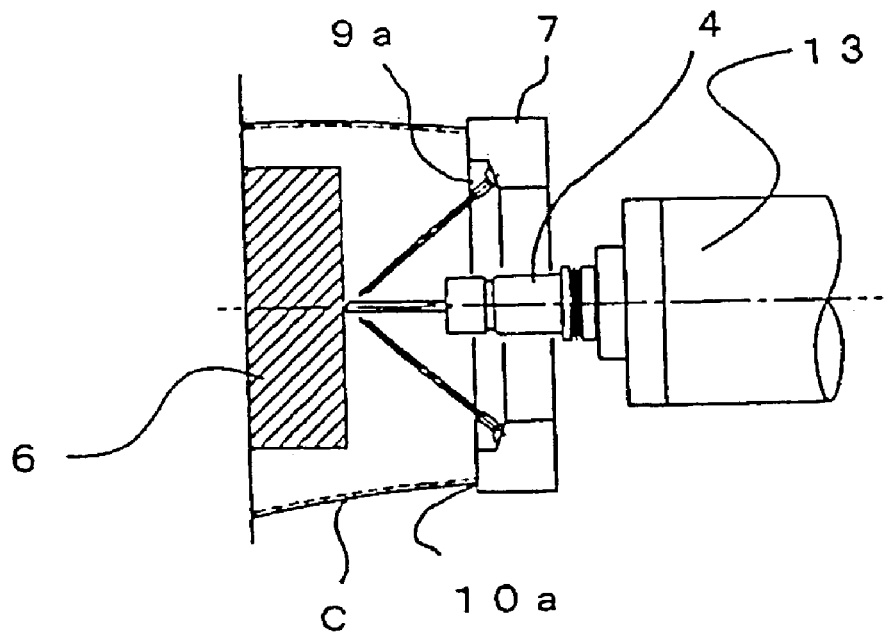
FIG. 9 is a side view showing an application of the embodiment of the apparatus for preventing chips and/or cutting liquid from being scattered according to the present invention to a horizontal-type machine tool.

FIG. 9 is a schematic view showing an embodiment in which the apparatus of the present invention is applied to the horizontal-type machine tool. It is to be noted that similar member elements to those of the embodiment shown in FIG. 1 are designated by like reference numerals. The cutting liquid feed device 7 has a hole in the center. The tool 4 and the spindle 13 approach the workpiece 6 through the hole in the cutting liquid feed device 7, and then make contact therewith to cut the workpiece 6. The cutting liquid feed device 7 has the annular shower nozzle 10a. In addition, the cutting liquid feed device 7 also has a plurality of cutting liquid nozzles 9a on the inside of the annular shower nozzle 10a, thereby allowing the cutting liquid C discharged through the cutting nozzles 9a to hit against the tool 4 at a predetermined position. The cutting liquid feed device 7 also allows the cutting liquid C discharged through the shower nozzle 10a to form a horizontally cylindrical shower curtain along the axis of the spindle 13. Thus, this shower curtain is provided so as to surround the spindle 13 and the tool 4, thereby preventing the chips and/or the cutting liquid C from being scattered.

Figure 10:
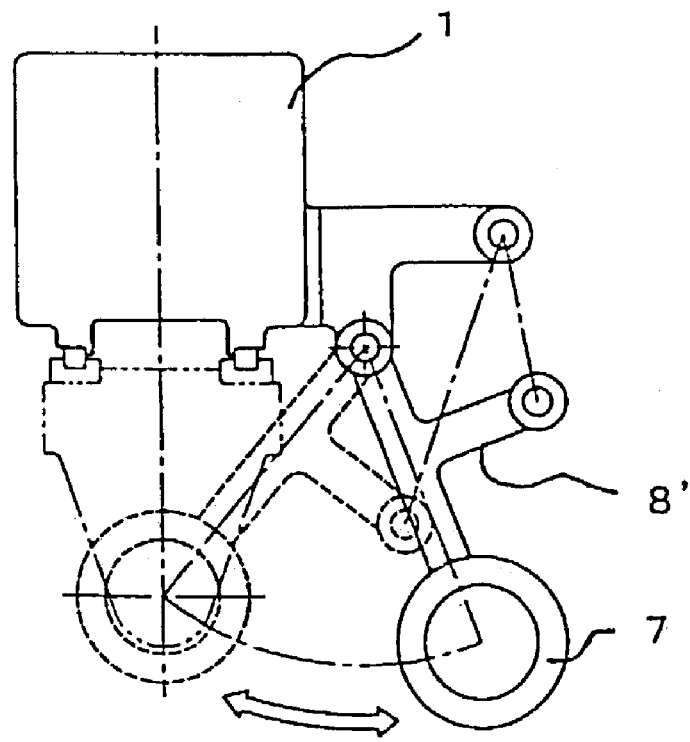
FIG. 10 illustrates an embodiment that enables the cutting liquid feed device shown in FIG. 1 or 9 to be shunted from a column side.
Figure 11:
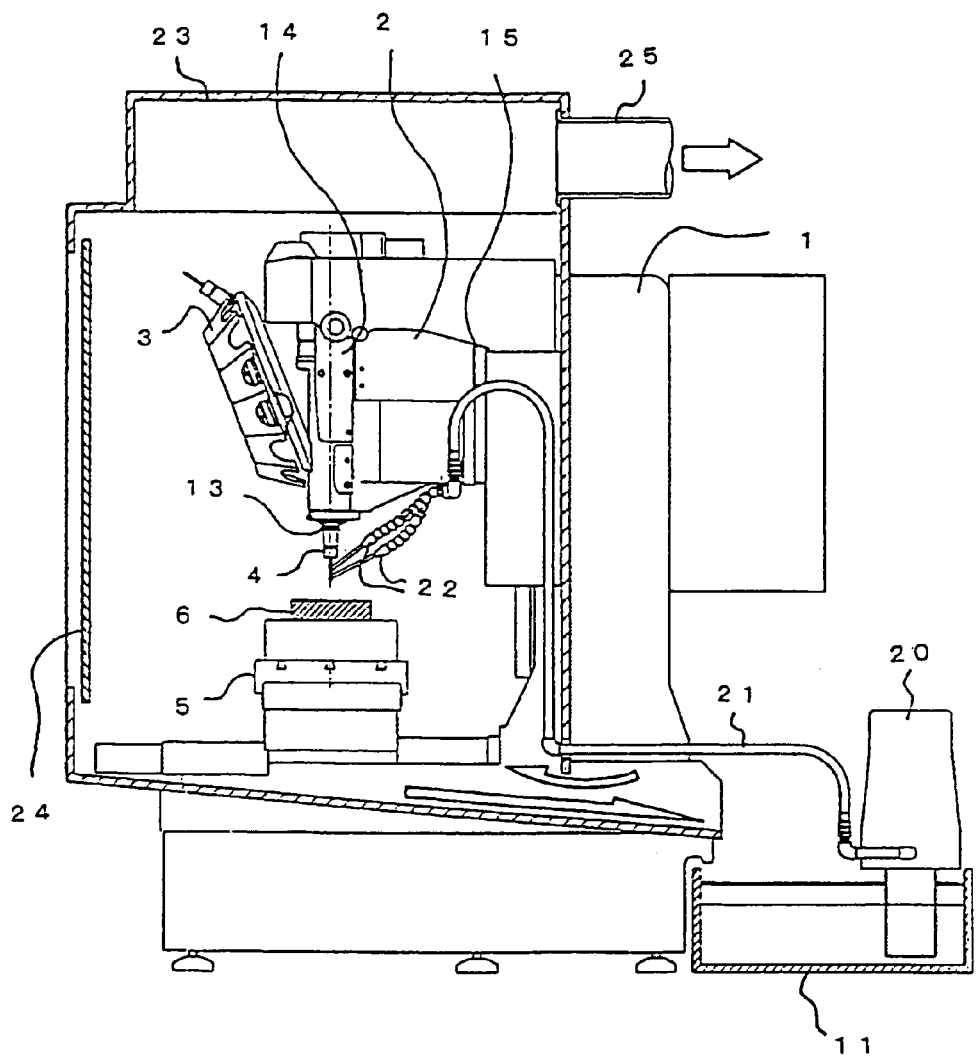
FIG. 11 is a side view showing a conventional machine tool having been realized in consideration of prevention of chips and/or cutting liquid from being scattered.

FIG. 10 shows an embodiment that enables the cutting liquid feed device 7 to be shunted in such a manner as to facilitate operations such as exchange of a workpiece. The cutting liquid feed device 7 is mounted to the column 1, not to the spindle head, differently from the conventional art. Accordingly, as shown in FIG. 10, the cutting liquid feed device 7 may be mounted to a support member 8' which is supported by the column 1 in a manner so as to rotatable around an axis. With the above configuration, the cutting liquid feed device 7 can be shifted so as to get out of the axis of the spindle, thereby facilitating the operations such as exchange of a workpiece.

Although the cutting liquid feed device 7 is mounted to the column 1 in the above embodiment of FIG. 10, the cutting liquid feed device 7 may also be mounted to a fixed portion such as a base and cover of a machine tool, other that the column 1, in case of a machine tool in which a table is moveable, since it is sufficient to cover the area of the workpiece 6 to be cut by the tool 4 with a shower curtain of the cutting liquid C. However, in case of a machine tool in which the column 1 moves in the directions orthogonal to the axial direction of the spindle 13, the cutting liquid feed device 7 has to be mounted to the column 1.

Although the above embodiments are applied to a machine tool that performs a cutting operation while spraying a tool with cutting liquid C, it is not necessary to provide a cutting liquid feed system such as the cutting liquid nozzle 9a, which includes the cutting liquid nozzle pump 9b, the cutting liquid nozzle hose 9c, the cutting liquid nozzle manifold 9d and the cutting liquid nozzle path 9e, in case of a machine tool that performs cutting operation without spraying a tool with cutting liquid. In this case, scattering of the chips resulting from the cutting can be prevented by means of a shower curtain discharged through the shower nozzle.

As described above, according to the present invention, even if the cutting liquid C splashes against the tool and the workpiece, the outer circumference of the cutting liquid C is surrounded with an annular shower curtain of the cutting liquid, so that scattering of the cutting liquid can be suppressed. In addition, among the chips produced from cutting point, lighter chips are blocked with the shower curtain of the cutting liquid C and caused to flow downwards, while heavier chips are caused to pass through the shower curtain of the cutting liquid C toward the outside. However, scattering of the chips is limited to a narrow range, so that the chips are not scattered upward to a tool exchanger having an empty tool pot or a standby tool. Thus, the problem such as the adhesion of the chips to the empty tool pot or the standby tool of the tool exchanger may be eliminated. In addition, the exchange of the tool may be performed as needed without stopping the discharge of the cutting liquid C to the tool and the discharge of the cutting liquid C for forming a shower curtain. Thus, the mist of cutting liquid resulting from cutting operation can be always confined within the shower curtain, so that environmental conditions inside and outside the machine tool can be maintained satisfactory. In addition, as the cutting liquid feed device is mounted to the column, it is possible to prevent lowering of acceleration/deceleration performance due to increase of inertia of the spindle portion.

Further, as the length of the shower curtain remains unchanged and an air inlet path adapted to draw the outside air into the shower curtain is provided, it is possible to prevent or alleviate deformation, pulsation, breakage and so on of the cylindrical shower curtain discharged through the shower nozzle with the air current caused by the revolution of the spindle having a spindle gear for driving a turret.

What is claimed is:

1. An apparatus for preventing chips from being scattered in a machine tool that allows a spindle to move relative to and cut a workpiece, comprising:
    a support member mounted on a stationary portion of said machine tool so as, during workpiece cutting, to keep constant a position of the support member relative to the workpiece in a direction of en axis of movement of said spindle and to keep constant a position of the support member relative to said spindle in directions orthogonal to the axis; and
    a liquid discharge device mounted to said support member and which has a liquid discharge opening;
    wherein said liquid discharge device is arranged to surround an area where said spindle moves or a cutting tool mounted for movement with the spindle moves,
    wherein said liquid discharge device has an air inlet path having a first opening and a second opening,
    wherein the first opening of said air inlet path is provided on an inside of said liquid discharge opening of the liquid discharge device, while the second opening of the air inlet path is provided at a position isolated from an air current caused by a revolution of the spindle, wherein liquid is discharged from said liquid discharge opening in a substantially continuous cylindrical film shape coaxial with the axis of spindle movement, surrounding and continuously spaced from the workpiece to prevent scattering of cutting chips laterally from the workpiece, and wherein air exits said first opening and moves in a space between the film shape liquid and the spindle to prevent disruption of the film shape by the air current caused by the revolution of the spindle.

2. The apparatus according to claim 1, wherein said liquid discharge device has a substantially circular shape.

3. The apparatus according to claim 1, wherein said liquid discharge device has a substantially polygonal shape.

4. The apparatus according to claim 1, wherein said liquid discharge device is a plurality of spaced linear shower nozzles.

5. The apparatus according to claim 1, wherein said support member can be moved relative to the stationary portion of the machine tool, when cutting is not occurring.

6. The apparatus according to claim 1, wherein the axis is vertical.

7. The apparatus according to claim 1, wherein the axis is horizontal.

8. An apparatus for preventing chips and cutting liquid from being scattered in a machine tool that allows a spindle to move relative to and out a workpiece, comprising:

a support member mounted on a stationary portion of said machine tool so as, during workpiece cutting, to keep constant a position of the support member relative to the workpiece in a direction of an axis of movement of said spindle and to keep constant a position of the support member relative to said spindle in directions orthogonal to the axis; and a liquid discharge device mounted to Bald support member and which has a liquid discharge opening; and a cutting liquid nozzle to supply cutting liquid to a cutting tool mounted for movement with the spindle, wherein said liquid discharge device is arranged to surround an area where the cutting tool moves, wherein said liquid discharge device has an air inlet path having a first opening and a second opening, wherein the first opening of said air inlet path is provided on an inside of said liquid discharge opening of the liquid discharge device, while the second opening of the inlet path is provided at a position isolated from an air current caused by a revolution of the spindle, wherein liquid is discharged from said liquid discharge opening in a substantially continuous cylindrical film shape coaxial with the axis of spindle movement, surrounding and continuously spaced from the workpiece to prevent scattering of cutting chips and the cutting liquid laterally from the workpiece, and wherein air exits said first opening and moves in a space between the film shape liquid and The spindle to prevent disruption of the film shape by the air current caused by the revolution of the spindle.

9. The apparatus according to claim 8, wherein said liquid discharge device is a shower nozzle having a substantially circular shape, and the cutting liquid nozzle is a plurality of cutting liquid nozzles arranged on en inside of said shower nozzle.

10. The apparatus according to claim 9, wherein said shower nozzle has a substantially polygonal shape.

11. The apparatus according to claim 9, wherein said shower nozzle is a plurality of spaced linear shower nozzles.

12. The apparatus according to claim 9, wherein the shower nozzle includes an opening at a center thereof through which the cutting tool moves.

13. The apparatus according to claim 8, wherein said support member can be moved relative to the stationary portion of the machine tool, when cutting is not occurring.

14. The apparatus according to claim 8, wherein the axis is vertical.

15. The apparatus according to claim 8, wherein the axis is horizontal.

* * * * *

UNITED STATES PATENT AND TRADEMARK OFFICE
CERTIFICATE OF CORRECTION

PATENT NO. : 7,128,505 B2
APPLICATION NO. : 10/462614
DATED : October 31, 2006
INVENTOR(S) : Naoki Sato et al.

It is certified that error appears in the above-identified patent and that said Letters Patent is hereby corrected as shown below:

On the cover page:

(57) Abstract, col. 2, line 9, change "todischarge" to --to discharge the--

Col. 5, line 46, change "log" to --10g--

Col. 7, line 5-12, after "distance.", delete "Among the chips produced by cutting the workpiece 6 with the tool 4, lighter chips are caused to flow downward with the shower curtain of the cutting liquid C while heavier chips are allowed to run out of the shower cartain of the cutting liquid C. It is to be noted that the shower curtain of the cutting liquid C dissipates the energy of the heavy chips, so that there is no possibility that the heavier chips are scattered in the distance." (second occurence).

Col. 7, line 27, change "to-the" to --to the--

Col. 10, line 55, change "en" to --an--

Col. 11, line 30, change "out" to --cut--

Col. 11, line 38, change "Bald" to --said--

Col. 12, line 17, change "The" to --the--

Col. 12, line 23, change "en" to --an--

Signed and Sealed this

Sixth Day of March, 2007

JON W. DUDAS
*Director of the United States Patent and Trademark Office*

UNITED STATES PATENT AND TRADEMARK OFFICE
CERTIFICATE OF CORRECTION

PATENT NO. : 7,128,505 B2  Page 1 of 1
APPLICATION NO. : 10/462614
DATED : October 31, 2006
INVENTOR(S) : Naoki Sato et al.

It is certified that error appears in the above-identified patent and that said Letters Patent is hereby corrected as shown below:

Column 7, Line 5-12, change "Among the chips produced by cutting the workpiece 6 with the tool 4, lighter chips are caused to flow downward with the shower curtain of the cutting liquid C while heavier chips are allowed to run out of the shower cartain of the cutting liquid C. It is to be noted that the shower curtain of the cutting liquid C dissipates the energy of the heavy chips, so that there is no possibility that the heavier chips are scattered in the distance." to
--Among the chips produced by cutting the workpiece 6 with the tool 4, lighter chips are caused to flow downward with the shower curtain of the cutting liquid C, while heavier chips are allowed to run out of the shower curtain of the cutting liquid C. It is to be noted that the shower curtain of the cutting liquid C dissipates the energy of the heavy chips, so that there is no possibility that the heavier chips are scattered in the distance.--

Signed and Sealed this

Seventeenth Day of March, 2009

JOHN DOLL
*Acting Director of the United States Patent and Trademark Office*

UNITED STATES PATENT AND TRADEMARK OFFICE
CERTIFICATE OF CORRECTION

PATENT NO.        : 7,128,505 B2
APPLICATION NO.   : 10/462614
DATED             : October 31, 2006
INVENTOR(S)       : Naoki Sato et al.

It is certified that error appears in the above-identified patent and that said Letters Patent is hereby corrected as shown below:

Column 7, Line 5-12, change "Among the chips produced by cutting the workpiece 6 with the tool 4, lighter chips are caused to flow downward with the shower curtain of the cutting liquid C while heavier chips are allowed to run out of the shower cartain of the cutting liquid C. It is to be noted that the shower curtain of the cutting liquid C dissipates the energy of the heavy chips, so that there is no possibility that the heavier chips are scattered in the distance." to
--Among the chips produced by cutting the workpiece 6 with the tool 4, lighter chips are caused to flow downward with the shower curtain of the cutting liquid C, while heavier chips are allowed to run out of the shower curtain of the cutting liquid C. It is to be noted that the shower curtain of the cutting liquid C dissipates the energy of the heavy chips, so that there is no possibility that the heavier chips are scattered in the distance.--

Signed and Sealed this

Thirty-first Day of March, 2009

JOHN DOLL
*Acting Director of the United States Patent and Trademark Office*